United States Patent Office 3,391,159
Patented July 2, 1968

3,391,159
3-(2-HALOBENZOYL)-INDOLES
Rodney Ian Fryer, North Caldwell, and Leo Henryk Sternbach, Upper Montclair, N.J., assignors to Hoffmann-La Roche Inc., Nutley, N.J., a corporation of New Jersey
No Drawing. Filed Apr. 26, 1966, Ser. No. 545,258
3 Claims. (Cl. 260—326.16)

ABSTRACT OF THE DISCLOSURE 3-(2-halobenzoyl)-indoles which are useful as intermediates in the preparation of pharmaceutically valuable 5 - (3 - indolyl) - 2,3 - dihydro - 1H - 1,4 - benzodiazepines are disclosed.

---

The present invention relates to a novel pharmacologically active compounds and intermediate therefor. More particularly, this invention relates to 5-(3-indolyl)-2,3 - dihydro - 1H-1,4-benzodiazepine. This compound, which can be administered as a base per se or in the form of an acid addition salt, has potent central nervous system antidepressant properties with minimal undesirable side effects, such as sedation, and is useful as an antidepressant. It prevents the uptake of norepinephrine by cardiac tissues and produces stimulation when given in combination with small doses of tetrabenazine. It is useful in reversing both exogenous and endogenous depression, for example, it is useful in reversing depression caused by the administration of a depressant such as tetrabenazine, and is also useful in potentiating the stimulant effect of other stimulants, such as amphetamine and cocaine. 5-(3 - indolyl) - 2,3-dihydro-1H-1,4-benzodiazepine can be administered internally, either as the base or in the form of a pharmaceutically acceptable acid addition salt, compounded in conventional pharmaceutical formulations. Thus, it can be adminstered, with dosage adjusted to individual requirements, enterally or parenterally in the form of both solid and liquid formulations such as tablets, capsules, dragées, suppositories, suspensions, solutions, emulsions or the like, which can contain standard pharmaceutical carriers or excipients such as lactose, corn starch, talc, calcium stearate, polyalkylene glycols, ethanol, vegetable oils, cocoa butter and the like. Moreover, such formulations can be subjected to standard pharmaceutical expedients such as sterilization, and can contain standard pharmaceutical additives such as buffers for the adjustment of pH, emulsifying agents, preservative agents, agents for the adjustment of osmotic pressure and the like. Such compositions can also contain other pharmaceutically active materials.

As indicated above, 5 - (3 - indolyl) - 2,3 - dihydro-1H-1,4-benzodiazepine can be administered in the form of pharmaceutically acceptable acid addition salts. This compound forms such salts with both organic and inorganic pharmaceutically acceptable acids such as hydrochloric acid, hydrobromic acid, phosphoric acid, sulfuric acid, nitric acid, acetic acid, succinic acid, maleic acid, para-toluene sulfonic acid and the like. Nonpharmaceutically acceptable acid addition salts can be converted into the base per se or into pharmaceutically acceptable acid addition salts by conventional metathetic reactions or by neutralization.

The compound of this invention, i.e., 5-(3-indolyl)-2,3-dihydro-1H-1,4-benzodiazepine, can be prepared by several methods. In one embodiment this compound is prepared by reacting 3-(2-halobenzoyl)-indole with ethylenediamine. The halogen in the halobenzoyl moiety of the indole starting material can be any of the four halogens, chlorine, bromine, iodine or fluorine, but chlorine, bromine and fluorine are preferred and fluorine is especially preferred. The reaction is preferably effected in the presence of an organic base such as pyridine, picoline, quinoline or the like. Moreover, this reaction is suitably effected at an elevated temperature, i.e., between about 25° C. and the reflux temperature of the reaction medium. The reaction can be conducted in the presence of an inert organic solvent such as a lower alkanol such as ethanol, ether, aromatic hydrocarbons such as benzene, toluene, cumene or the like, and it is preferred to utilize the organic base and/or an excess of the ethylenediamine as the reaction medium. In another embodiment, 5 - (3 - indolyl) - 2,3 - dihydro - 1H - 1,4-benzodiazepine is prepared by hydrolysis of 5-[3-(N-acyl - indolyl)] - 2,3 - dihydro - 1H - 1,4 - benzodiazepine. The acyl moiety can be any hydrolyzable acyl moiety, for example, lower alkanoyl such as acetyl, benzoyl, substituted benzoyl such as halobenzoyl, or the like. The starting material 5 - [3 - (N - acyl - indolyl)]-2,3 - dihydro - 1H - 1,4 - benzodiazepine can be prepared by reaction of 3 - (2 - halobenzoyl) - 1 - acyl - indole with ethylenediamine according to procedures above-described for reacting nonacylated compounds.

The 5 - [3 - (N - acyl - indolyl)] - 2,3 - dihydro-1H - 1,4 - benzodiazepine intermediates are novel compounds within the scope of this invention, as are the starting material 3 - (2 - halobenzoyl) - indoles of the formula

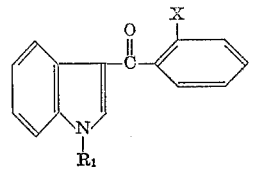

wherein X is a halogen and $R_1$ is hydrogen or acyl. The end product 5 - (3 - indolyl) - 2,3 - dihydro - 1H - 1,4-benzodiazepine is of the formula

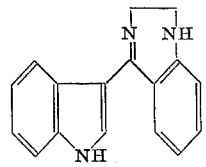

The starting material indoles of Formula I can be prepared by a reaction of indole with an o-halobenzoyl halide in the presence of a Grignard reagent such as phenyl magnesium bromide, methyl magnesium iodide or the like. The Grignard reagent has the function of forming the indolyl Grignard reagent such as indolyl magnesium bromide or indolyl magnesium iodide, which then undergoes reaction with the o-halobenzoyl halide to form the desired product of Formula I. In this reaction the 1,3-bis-(2-halobenzoyl)-indole is also formed, and this compound can either be hydrolyzed, with or without isolation, to yield the corresponding compound of Formula I wherein $R_1$ is hydrogen, or can itself be subjected to reaction with ethylenediamine whereby there is obtained a 5-[3-(N-o-halobenzoyl-indolyl)]-2,3-dihydro-1H-1,4-benzodiazepine which can then be hydrolyzed to yield the desired 5-(3-indolyl)-2,3-dihydro-1H-1,4-benzodiazepine. The starting materials of Formula I wherein $R_1$ is hydrogen can also be prepared by reacting indole with a tertiary amide of ortho-halobenzoic acid, e.g., N,N-di-lower alkyl-o-halobenzamide, in the presence of phosphorous oxychloride. The starting material compound of Formula I wherein $R_1$ is acyl can also be formed by acylation, according to means known per se, of a compound of Formula I wherein $R_1$ is hydrogen.

The following examples are illustrative but not limitative of this invention. All temperatures are stated in degrees centigrade.

Example 1

In a 2 l. three-necked flask equipped with a mercury sealed stirrer, a pressure equalizing dropping funnel and reflux condenser fitted with a Dry Ice condenser and drying tube, was placed 24.3 g. of magnesium turnings. A solution of 176 g. of bromobenzene in 300 ml. of ether was placed in the separatory funnel and 70 ml. of this solution was then added to the flask. A warm water bath (ca. 45°) and agitation of the stirrer by hand was used to help initiate the reaction. After the reaction had started, an additional 30 ml. of bromobenzene solution was added to the flask and stirring was begun; the warm water bath was then replaced by an ice water bath. The remainder of the ether solution was added during 1 hr.; the cooling bath was removed after the initial vigorous reaction had subsided somewhat. After completion of the addition of the ether solution, the resultant mixture was heated with a warm water bath (45–50°) for 20 minutes. A solution of 130 g. of indole in 300 ml. of dry benzene (prepared by distilling benzene and discarding the first fraction) was added dropwise with stirring at room temperature in the course of 1–1.5 hr. The resultant greenish solution was heated under gentle reflux for 1 hr. and then cooled in an ice bath. A solution of 179 g. of o-fluorobenzoyl chloride in 200 ml. of benzene was added with vigorous stirring in the course of 2 hr. The ice bath was then removed and the resultant mixture heated under gentle reflux for 45 minutes. During this heating period there was a rapid color change from brown to a deep red (the mixture became very viscous and was somewhat difficult to stir).

The flask was then cooled in ice and the complex hydrolyzed by the dropwise addition of 400 ml. of 10% ammonium chloride in water (stirring was difficult during the initial stages of the hydrolysis). Stirring was continued at room temperature for 45 minutes after all of the ammonium chloride solution was added. The red solid (any particles of the red, viscous product adhering to the walls of the flask were scraped off using a spatula) was collected on a filter, washed with 400 ml. of water and 400–600 ml. of ether. Thin layer chromatography (fluorescent silica gel plate, ethyl acetate-hexane, 1/1) showed this solid to be a mixture of 3-(2-fluorobenzoyl)-indole and 1,3-bis(2-fluorobenzoyl)-indole. The solid was then covered with 600 ml. of acetone, the mixture heated on a steam bath until boiling and then 200 ml. of aqueous 5% sodium hydroxide was added thereto along with 100 ml. of methanol. The alkali-containing mixture was then heated for 20 minutes with acetone being added as needed to maintain the original volume. Also, as the 1,3-bis(2-fluorobenzoyl)-indole was hydrolyzed during the heating, a small amount of the less soluble 3-(2-fluorobenzoyl) occasionally separated as a pale-orange solid. The mixture was then poured into 1800 ml. of water and the resultant suspension cooled in ice for 2 hr. The resultant yellow-orange solid was collected and washed with 2 l. of water. The product was recrystallized by dissolving in a mixture of 600 ml. of acetone and 500 ml. of methanol and filtering while hot through a steam-jacket funnel. The filtrate was concentrated on the steam bath until crystals started to separate and then the mixture was refrigerated (0–5°) overnight. The resultant solid was filtered and washed with ether yielding 3-(2-fluorobenzoyl)-indole as off-white colored crystals, M.P. 195–197°. Concentration of the filtrate yielded additional product.

The filtrate obtained after hydrolyzing the reaction mixture with ammonium chloride and collecting the red solid, was combined with the water and ether washings. The organic layer was separated, washed three times with 250 ml. portions of water, dried over sodium sulfate and concentrated to dryness at reduced pressure. The resultant red, viscous, semi-solid mixture was covered with 150 ml. of ethanol and heated on the steam bath for 10 minutes, making certain that all of the red, oily material came in contact with the solvent. After refrigeration for 2–3 hr. the solid was collected and washed free of the red color with ethanol. The white 1,3-bis(2-fluorobenzoyl)-indole thus obtained as a white solid was hydrolyzed in a mixture of 300 ml. of hot acetone and 150 ml. of 10% aqueous sodium hydroxide by heating on the steam bath for 20 minutes. The hydrolysis mixture was then poured into 1600 ml. of water and cooled in ice for 2–3 hr. The product was obtained by filtration and was washed with approximately 2 l. of water and then dried at 70° in a vacuum oven overnight yielding 3-(2-fluorobenzoyl)-indole as white prisms, M.P. 195–198°. An examination of the combined product on thin layer chromatography showed only one spot at $R_f$ 0.17 using a fluorescent silica gel plate and a ethyl acetate-hexane (1/1) solvent system.

Example 2

In a 1 l. round-bottomed flask, equipped with a reflux condenser protected by a drying tube was placed 100 g. of 3-(2-fluorobenzoyl)-indole, 500 ml. of pyridine and 234 ml. of ethylenediamine. The mixture was heated under reflux for 20 hr., cooled to room temperature and the supernatent liquid was then decanted from the white, oily mass at the bottom of the flask. The supernate was concentrated at reduced pressure to remove all of the pyridine and excess ethylenediamine. The resultant oily residue was dissolved immediately, while hot in 1 l. of dichloromethane (agitation while heating on the steam bath assisted in solubilizing the oil). The dichloromethane solution was cooled in the refrigerator overnight and the solid was collected, washed with two 100 ml. portions of dichloromethane and dried in a vacuum oven at 70° for 3 hr. yielding 5-(3-indolyl)-2,3-dihydro-1H-1,4-benzodiazepine as pale-yellow needles, M.P. 212–216° (thin layer chromatography on fluorescent silica gel plates showed one spot using a solvent system of 4 parts of 96% ethanol to 1 part of ammonium hydroxide).

The filtrate and the dichloromethane wash were combined, washed with water (3× 350 ml.) and then extracted with 2 N sulfuric acid (3× 300 ml.). The sulfuric acid extract was made basic (pH 10–11) at 0–10° with ca. 900 ml. of 10% sodium hydroxide, and the resulting solution was then extracted with dichloromethane (3× 500 ml.). The organic layers were combined, washed with saturated brine (3× 250 ml.), dried over sodium sulfate and concentrated to ca. 250 ml. and kept in the refrigerator overnight. The product was obtained by filtration and was washed with dichloromethane (2× 25 ml.) and dried yielding additional 5-(3-indolyl) - 2,3 - dihydro-1H-1,4-benzodiazepine, M.P. 212–216°.

The recrystallization of the product was effected as follows: 52 g. of 5-(3-indolyl)-2,3-dihydro-1H-1,4-benzodiazepine was dissolved in 900 ml. of hot ethanol and while boiling, water was added slowly until crystals began to separate (ca. 350 ml. of water used). After refrigeration (0–5°) overnight, the resultant yellow solid was collected and washed with water (2× 100 ml.). The product was dried at 80° in a vacuum oven giving purified product, M.P. 223–225°.

Example 3

A solution of indole (15.9 g.), 2-fluoro-N,N-dimethylbenzamide (44.8 g.) and phosphorus oxychloride (15 ml.) was heated with vigorous stirring. After reaching 88° a vigorously exothermic reaction occurred and ice-bath cooling was applied. The temperature rose to 150° and then gradually fell to below 60°. The mixture was heated for 3 hr. at 80°. The resultant brown solution was cooled in ice, basified carefully with 3 N sodium hydroxide (pH 9), (the temperature was moderated during basification by the addition of chopped ice), and extracted with dichloromethane. The dichloromethane was washed with 0.1 N hydrochloric acid, water, dried over sodium sulfate and filtered over 100 g. of synthetic magnesia silica gel (Florisil 30–60 mesh). Evaporation of the solvent gave an amber oil which was treated with ether and refrigerated yielding pale-yellow prisms of 3-(2-fluorobenzoyl)-indole which upon recrystallization from ethanol gave white prisms, M.P. 195–198°.

Example 4

A solution of 19 g. of 1-acetyl-3-(2-fluorobenzoyl)-indole in a mixture of 85 ml. of pyridine and 65 ml. of ethylenediamine was heated under reflux for 21 hr. The mixture was concentrated at reduced pressure and the residue partitioned between dichloromethane and 2 N hydrochloric acid. The acid layer was separated, cooled in ice and basified (pH 9–10) with 5% sodium hydroxide to hydrolyze any 5-[3-(N-acetyl-indolyl)]-2,3-dihydro-1H-1,4-benzodiazepine remaining in the reaction mixture. The resultant yellow, oily suspension was stirred at room temperature for 1.25 hr. and extracted with dichloromethane. The organic layer was separated, washed with water, dried and concentrated to small volume. Refrigeration and filtration yielded 5-(3-indolyl)-2,3-dihydro-1H-1,4-benzodiazepine as yellow crystals, M.P. 210–214°.

Example 5

A solution of 18 g. of 1,3-bis-(2-fluorobenzoyl)-indole in 25 ml. of ethylenediamine and 50 ml. of pyridine was heated under reflux for 21 hr. and concentrated. The residue was partitioned between dichloromethane and 3 N hydrochloric acid and the acid layer separated and basified (in ice) with 10% sodium hydroxide to hydrolyze any 5-[3 - (N - fluorobenzoyl-indolyl)] - 2,3 - dihydro-1H-1,4-benzodiazepine remaining in the reaction mixture. The viscous, yellow oil which precipitated was stirred in the alkaline solution for 1.5 hr., and then extracted with dichloromethane. The organic layer was washed with water, dried and concentrated to approximately 80 ml. Scratching helped to initiate the crystallization of the product. After refrigeration, filtration gave 5-(3-indolyl)-2,3-dihydro-1H-1,4-benzodiazepine as yellow crystals, M.P. 211–214°.

Example 6

To a stirred solution of phenylmagnesium bromide (prepared from 24.3 g. of magnesium turnings, 176 g. of bromobenzene and 300 ml. of tetrahydrofuran) was added 130 g. of indole in 300 ml. of dry benzene over 1 hr. The solution was heated under gentle reflux for 1 hr., cooled in ice and 159 g. of o-fluorobenzoyl chloride in 200 ml. of benzene added dropwise over 2 hr. The resultant mixture was heated under reflux for 45 min., and after stirring overnight at room temperature, the mixture was immersed in ice and hydrolyzed by the dropwise addition of 250 ml. of 10% ammonium chloride in water. The mixture was stirred for 15 min., filtered from a small amount of solid and the organic layer separated, washed with water, dried over sodium sulfate and concentrated to small volume. After refrigeration, the product was filtered and washed with cold ethanol yielding 1,3-bis-(2-fluorobenzoyl)-indole as a pale pink-tinged solid which upon recrystallization from ethanol gave white needles, M.P. 132–134°.

Example 7

A mixture of 25 g. of 3-(2-fluorobenzoyl)-indole, 200 ml. of acetic anhydride and 20 g. of anhydrous sodium acetate was heated under reflux for 3 hr. After being poured into 750 ml. of water, the precipitated solid was extracted with ca. 800 ml. of ether and the organic layer washed, dried and concentrated. The residue was recrystallized from ca. 300 ml. of methanol yielding 1-acetyl-3-(2-fluorobenzoyl)-indole as white, feathery needles, M. P. 117–119°.

Example 8

A solution of 2 g. of 5-(3-indolyl)-2,3-dihydro-1H-1,4-benzodiazepine in methanol was treated with an equivalent of methanolic hydrogen chloride and then a small amount of ethyl ether. After refrigeration, filtration yielded 5 - (3-indolyl)-2,3-dihydro-1H-1,4-benzodiazepine hydrochloride as bright, yellow needles, M.P. (turns orange at approximately 170°), 180–185° (dec.).

Example 9

A solution of 4 g. of 3-(2-fluorobenzoyl)-indole in 50 ml. of ethylenediamine was refluxed overnight and then poured into 1 liter of water. The resultant mixture was extracted with dichloromethane and the organic layer separated, washed with water and extracted four times, each time with 100 ml. of 1 N hydrochloric acid. The combined acid extract was basified with sodium hydroxide and extracted with dichloromethane. The organic extracts were washed, dried and evaporated. The yellow oil thus obtained was refluxed for 2 hr. with 100 ml. of 6 N hydrochloric acid, cooled and extracted with dichloromethane. The acid layer was basified, extracted with dichloromethane, washed, dried and evaporated. The residue was dissolved in 50 ml. of pyridine and refluxed for 5 hr. Evaporation yielded an oil which was partitioned between dichloromethane and water. The dichloromethane layer was washed, dried and evaporated. The residual oil was dissolved in ethyl acetate, filtered over synthetic magnesia silica gel (Florisil) and concentrated. The residue was crystallized from dichloromethane-petroleum ether yielding 5-(3-indolyl)-2,3-dihydro-1H-1,4-benzodiazepine as yellow rods, M.P. 215–223°.

Example 10

A suppository formulation containing the following ingredients was prepared as indicated:

| | Per 1.3 Gm. suppository |
|---|---|
| 5 - (3 - indolyl) - 2,3 - dihydro-1H-1,4-benzodiazepine | 0.025 |
| Wecobee M [1] | 1.230 |
| Carnauba wax | 0.045 |

[1] A synthetic cocoa butter base available from E. F. Drew Company, 522 5th Ave., New York, N.Y.

The Wecobee M and carnauba wax were melted in a suitable size glass lined container (stainless steel can also be used), mixed well and cooled to 45°. The 5-(3-indolyl) - 2,3 - dihydro - 1H,1,4-benzodiazepine, which had been reduced to a fine powder with no lumps, was added and stirred until completely and uniformly dispersed. The mixture was then poured into suppository molds to yield suppositories having an individual weight of 1.3 gms. They were cooled and removed from molds. The suppositories were then individually wrapped in wax paper for packaging (foil can also be used).

Example 11

A capsule formulation containing the following ingredients was prepared as indicated:

| | Per capsule, mg. |
|---|---|
| 5 - (3 - indolyl) - 2,3 - dihydro - 1H-1,4-benzodiazepine | 10 |
| Lactose | 173 |
| Corn starch | 37 |
| Talc | 5 |
| Total weight | 225 |

The 5 - (3-indolyl)-2,3-dihydro-1H-1,4-benzodiazepine was mixed with the lactose and corn starch in a suitable mixer. The mixture was further blended by passing through a suitable comminuting machine, e.g., a Fitzpatrick Comminuting Machine with a No. 1A screen with knives forward. The blended powder was then returned to the mixer, the talc added and blended thoroughly. The so-formed mixture was then filled into No. 4 hard shell gelatin capsules on a capsulating machine (the Parke-Davis capsulating machine or any similar type machine is suitable).

Example 12

A tablet formulation containing the following ingredients was prepared as indicated:

| | Per tablet, mg. |
|---|---|
| 5 - (3 - indolyl) - 2,3 - dihydro-1H-1,4-benzodiazepine | 25.0 |
| Lactose, spray dried | 72.0 |
| Corn starch, U.S.P. | 2.0 |
| Calcium stearate | 1.0 |
| Total weight | 100.0 |

The 5 - (3-indolyl)-2,3-dihydro-1H-1,4-benzodiazepine, lactose, corn starch and calcium stearate were blended in a suitable mixer. The so-formed powder was compressed on a heavy duty tablet compressing machine and yielded tablet slugs of about 1″ diameter and ¼″ thickness. The tablet slugs were then passed through a suitable comminuting machine and yielded granules of approximately 16 mesh with a minimum of fines. The granulation was re-compressed on a tablet compressing machine using a ¼″ standard concave punch to an average tablet weight of 100 mg.

Example 13

A parenteral formulation containing the following ingredients was prepared as indicated:

| | Per ml. |
|---|---|
| 5-(3-indolyl)-2,3-dihydro - 1H - 1,4 - benzodiazepine mg | 5.1 |
| Benzyl alcohol mg | 20.0 |
| Ethanol anhydrous mg | 100.0 |
| Dimethylacetamide mg | 100.0 |
| Drew Oil 1400 [1] q.s. | 1 |

[1] This is a modified coconut oil, mostly triglycerides with average chain of $C_{10}$–$C_{12}$ available from E. F. Drew Company, 522 5th Ave., New York, N.Y.

The 5 - (3-indolyl)-2,3-dihydro-1H-1,4-benzodiazepine was dissolved in the dimethylacetamide and benzyl alcohol. The ethanol was then added to the so-formed solution, and the solution was brought up to final volume by adding the Drew Oil 1400. The solution was then filtered by pressure through an 0.5 micropore size filter. After this, the solution was filtered aseptically into sterile ampuls, gassed with nitrogen and sealed.

We claim:

1. 3-(2-halobenzoyl)-1-$R_1$-indole wherein $R_1$ is selected from the group consisting of hydrogen, lower alkanoyl, benzoyl, and halobenzoyl.

2. A compound as in claim 1 which is 3-(2-fluorobenzoyl)-indole.

3. A compound as in claim 1 which is 1,3-bis-(2-fluorobenzoyl)-indole.

References Cited
FOREIGN PATENTS 668,506   8/1963   Canada.

NICHOLAS S. RIZZO, *Primary Examiner.*

J. NARCAVAGE, *Assistant Examiner.*

Disclaimer 3,391,159.—*Rodney Ian Fryer*, North Caldwell and *Leo Henryk Sternbach*, Upper Montclair, N.J. 3-(2-HALOBENZOYL)-INDOLES. Patent dated July 2, 1968. Disclaimer filed Mar. 28, 1969, by the assignee, *Hoffmann-La Roche Inc.*

Hereby enters this disclaimer to claim 1 of said patent.

[*Official Gazette July 8, 1969.*]